United States Patent
Lin et al.

(10) Patent No.: US 8,156,410 B2
(45) Date of Patent: Apr. 10, 2012

(54) FAST DEBUGGING TOOL FOR CRC INSERTION IN MPEG-2 VIDEO DECODER

(75) Inventors: Chan-Shih Lin, Tainan (TW); Kuei-Lan Lin, Tainan (TW)

(73) Assignee: Himax Technologies Limited (TW)

( * ) Notice: Subject to any disclaimer, the term of this patent is extended or adjusted under 35 U.S.C. 154(b) by 1071 days.

(21) Appl. No.: 12/042,995

(22) Filed: Mar. 5, 2008

(65) Prior Publication Data
US 2009/0228770 A1 Sep. 10, 2009

(51) Int. Cl.
*H03M 13/00* (2006.01)

(52) U.S. Cl. ............ 714/781; 714/807; 375/240.27

(58) Field of Classification Search ........... 714/781, 714/807; 375/240.27
See application file for complete search history.

(56) References Cited

U.S. PATENT DOCUMENTS

| | | | |
|---|---|---|---|
| 7,434,150 B1 * | 10/2008 | Barash | 714/807 |
| 2003/0043923 A1 * | 3/2003 | Zhang et al. | 375/240.27 |

* cited by examiner

*Primary Examiner* — Sam Rizk
(74) *Attorney, Agent, or Firm* — Baker & McKenzie LLP

(57) ABSTRACT

A video decoder capable of generating a check data in response to a data selection code for debugging is disclosed. The video decoder includes a plurality of functional blocks, wherein each said plurality of functional blocks has a output signal to be used as an input signal for a next stage functional block; a multiplexer (209) that receives a plurality of data extracted from said plurality of output signals from said plurality of functional blocks, and outputs one of said plurality of data according to said data selection code; and a check logic (210) that generates said check data by calculating one of said plurality of data outputted from said multiplexer.

8 Claims, 2 Drawing Sheets

FAST DEBUGGING TOOL FOR CRC INSERTION IN MPEG-2 VIDEO DECODER

BACKGROUND

I. Field of the Invention

The present invention relates to the field of video signal processing, and more particularly to a video decoder debugging system and method thereof.

II. Background of the Invention

Digital video has become common in the field of consumer electronics, due in large part to the emergence of digital video standards such as MPEG-1, MPEG-2 and MPEG-4. The challenging of a video decoder technology is to design a decoder that can precisely decode the bitstream data and send to the display engine for viewing.

If an error happened during the decoding process, the video decoder will not be able to deliver a correct picture frame to the display. A debugger must find the error data path and fix the error in a short time in order to meet users' need.

In FIG. 1, a schematic diagram illustrates a conventional video decoder functional blocks that decode multimedia bitstream data.

As shown, the conventional video decoder system 100 includes a header parser 101, a bitstream buffer 102, a variable length decoder (VLD) 103, an inverse discrete Cosine transform (IDCT) 104, a motion compensation (MC) 105, an address translation and arbiter 106, a reconstruction 107 and a video decoder controller (VDEC) 108. The VDEC controller 108 issues control signals to regulate the operation of the above-mentioned functional blocks. The address translation and arbiter 106 connects to a traffic controller 120 and the traffic controller 120 further connects to a storage device 130, e.g., double data rate dynamic random access memory (DDR). The address translation and arbiter 106 also connects to the bitstream buffer 102 and the motion compensation 105. The bitstream buffer 102 connects to the header parser 101 and the variable length decoder (VLD) 103. The header parser 101 connects to the variable length decoder (VLD) 103 and the address translation and arbiter 106. The variable length decoder (VLD) 103 connects to the inverse discrete Cosine transform (IDCT) 104 and the motion compensation 105. The inverse discrete Cosine transform (IDCT) 104 and the motion compensation 105 connect to the reconstruction 107. The reconstruction 107 connects to the address translation and arbiter 106.

An encoded bitstream data is fetched from the DDR 130 via the traffic controller 120 by the address translation and arbiter 106 and put into the bitstream buffer 102. The encoded bitstream data is then sent to the header parser 101 for parsing system information and such system information is sent back to DDR 130 via the address translation and arbiter 106 for the use of CPU or VDEC controller 108. The bitstream buffer 102 sends the bitstream data to VLD 103 for parsing data information with reference to the information provided by header parser 101. VLD 103 sends the motion vector to TDCT 104 and MC 105. The TDCT 104 will generate a spatial domain difference. MC 105 will fetch a reference frame from the DDR 130 with reference to the motion vector provided by VLD 103. Both the output of IDCT 104 and MC 105 will be sent to reconstruction 107 and have a decoded frame. The traffic controller 120 further connects to a reduced instruction set computer (RISC) 140 for additional data computing, an audio decoder 150 for audio signal decoding and a display engine 160 for displaying the decoded video bitstream data.

However, it is difficult to locate the error data path during the decoding process because: (1) The debugger needs to dump the decoded frame buffer, which is a huge size of data, from the external DRAM to compare with the golden data, and (2) the debugger needs to rely on the logic analyzer to trace all the possible signals which cost a lot of time and equipments.

Therefore, there is a need for an alternative video decoder structure featuring a debugging functional block design that can improve the above-mentioned drawbacks.

SUMMARY OF THE INVENTION

Systems, methods, and apparatuses for an improved video decoder debugging tool are disclosed. In order to overcome the disadvantages of the conventional system and method, the present invention provides an improved video decoder debugging tool that inserts a cyclic redundancy check (CRC) logic in a MPEG-2 video decoder. Such improvement features a new structure of functional blocks capable of quickly identifying data path errors. In one aspect, a video decoder capable of generating a check data in response to a data selection code for debugging is disclosed. The video decoder includes: (1) a plurality of functional blocks, wherein each said plurality of functional blocks has an output signal to be used as an input signal for a next stage functional block; (2) a multiplexer that receives a plurality of data extracted from said plurality of output signals from said plurality of functional blocks, and outputs one of said plurality of data according to said data selection code; and (3) a check logic that generates said check data by calculating one of said plurality of data outputted from said multiplexer.

In another aspect, a video decoder debugging system is disclosed. The video decoder debugging system includes: (1) a plurality of functional blocks, wherein each said plurality of functional blocks couples to a next stage functional block with a data path; (2) a multiplexer that receives a plurality of data extracted from said data path of each said plurality of functional blocks; (3) a check logic operably coupled to an output signal of said multiplexer and calculates said output signal of said multiplexer; and (4) a controller that stores a result that compares a golden data against a calculation result of said check logic.

In still another aspect, a method of debugging a video decoder system is disclosed. The method comprises the following steps: (1) a plurality of input signals is provided to a multiplexer; (2) a first control signal is issued from a controller to said multiplexer; (3) one of said plurality of input signals is allowed to pass through said multiplexer; (4) a check logic calculates said input signal and further generates a calculation result; (5) a golden data is compared to said calculation result and said check logic further generate a comparison result; and (6) the comparison result is stored to said controller.

Some advantages of the present invention are: (1) prompt identification of errors without the need to dump all external data from external DRAM; (2) insertion of a check logic such as cyclic redundancy check (CRC) logic provides a fast debugging tool for the MPEG-2 video decoder; and (3) recognition of the data path problems made easier by adding some mode selection codes in the decoder, which can help the debugger to locate errors without using a logic analyzer. These and other features, aspects, and embodiments of the invention are described below in the section entitled "Detailed Description."

BRIEF DESCRIPTION OF THE DRAWINGS

The accompanying drawings, which are incorporated in and constitute part of this specification, illustrate various embodiments of the invention and together with the description serve to explain the principles of the invention.

DETAILED DESCRIPTION

While the invention is described here in terms of embodiments, the invention is not intended to be limited to just those embodiments. On the contrary, the invention is intended to cover alternatives, modifications and equivalents, which may be included within the spirit and scope of the appended claims. In the following detailed description, numerous specific details are set forth in order to provide a thorough understanding of the invention. As is obvious to one of ordinary skilled in the art, the invention may be practiced without these specific details. In other instances, well-known methods, procedures, components, and circuits have not been described in detail so that the essence of the invention will not be obscured.

One embodiment of the present invention discloses a video decoder capable of generating a check data in response to a data selection code for debugging. The present invention features a new functional blocks structure capable of effectively identifying data path errors. The proposed video decoder debugging functional blocks comprise a multiplexer and a cycling redundancy check logic.

Embodiment

Figure 1:
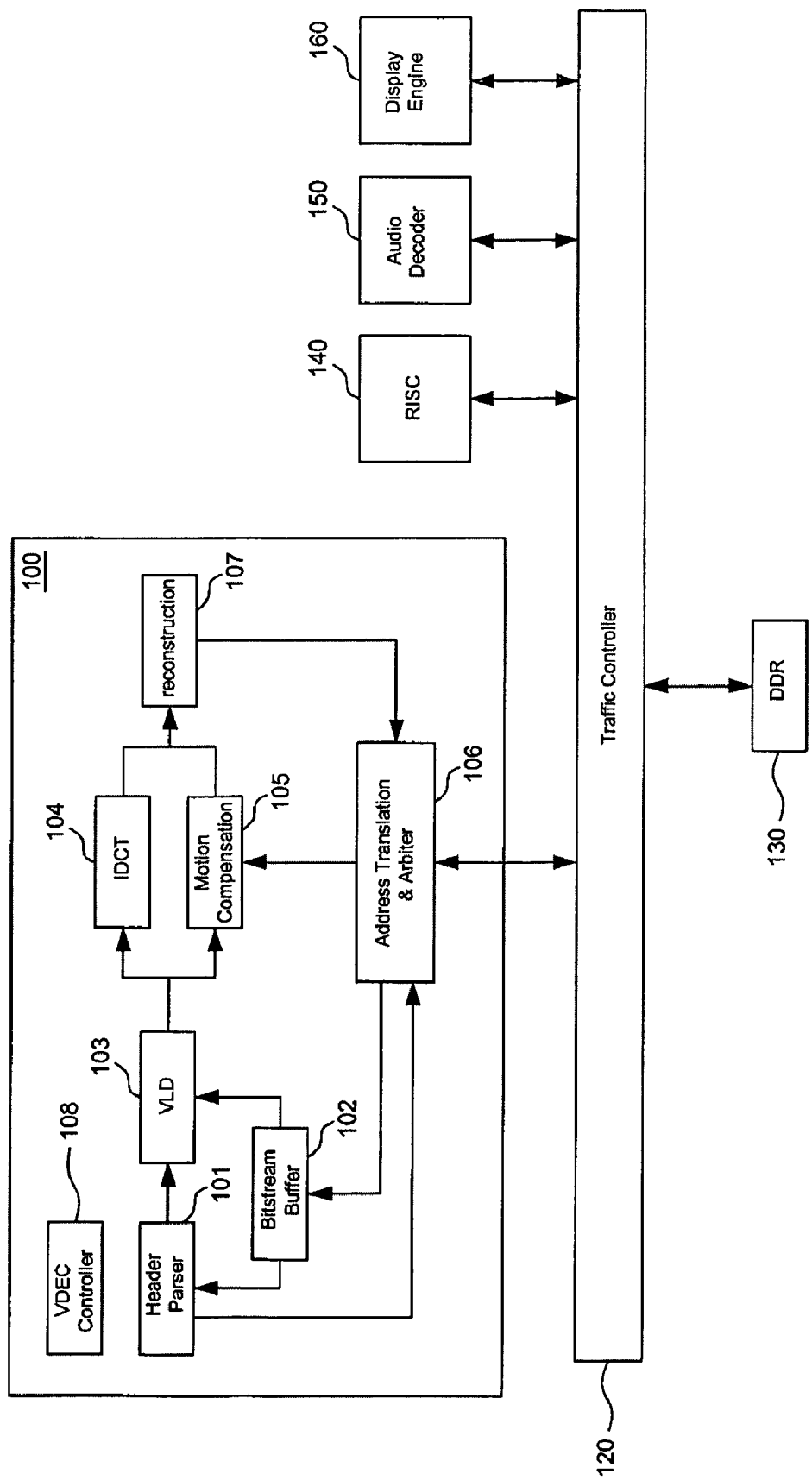
FIG. 1 illustrates a schematic diagram of the conventional video decoder functional blocks that decode multimedia bitstream data, in accordance with one embodiment.
Figure 2:
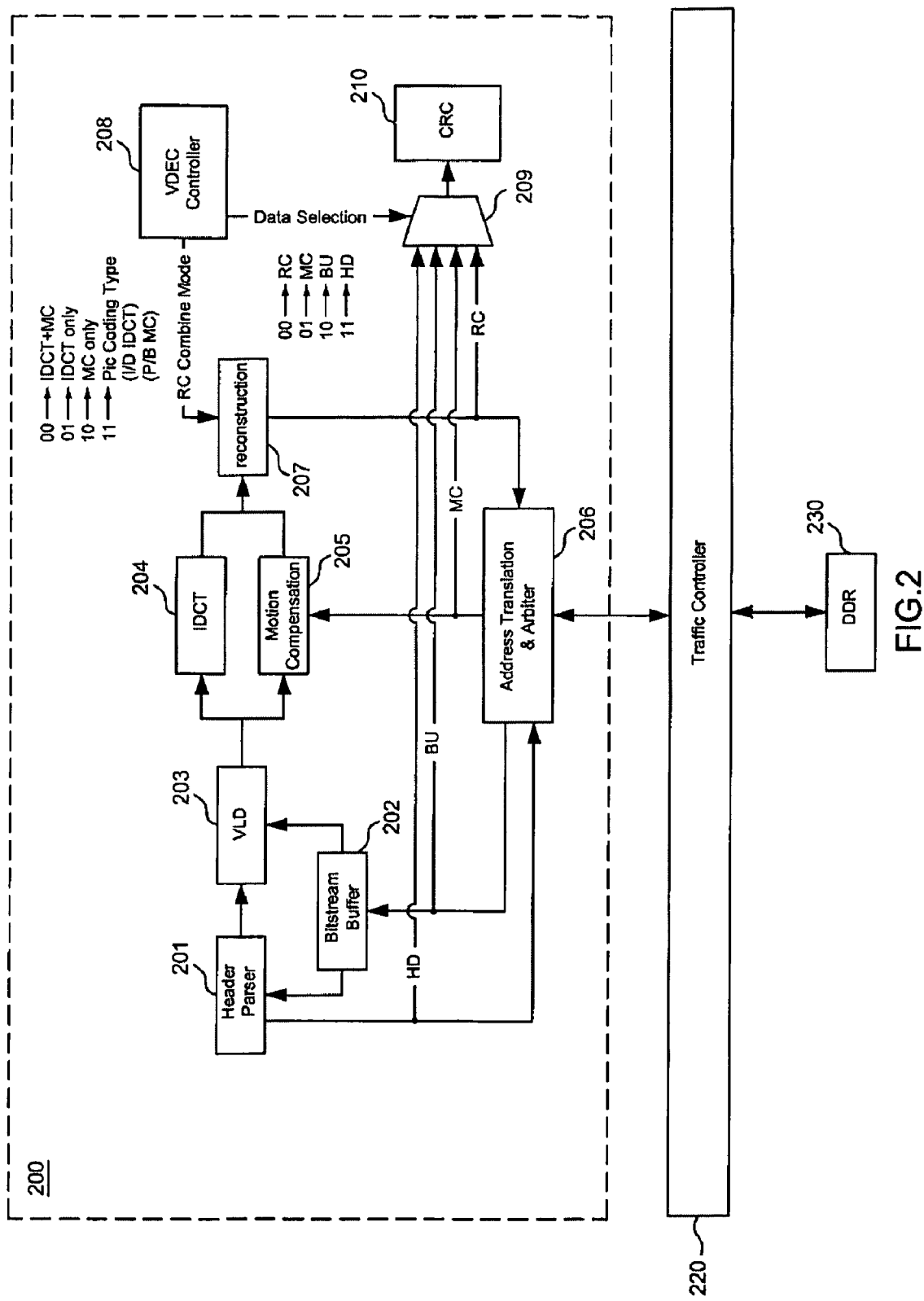
FIG. 2 illustrates a schematic diagram of the proposed video decoder featuring debugging functional blocks with debugging capability in accordance with one embodiment of the present invention.

In FIG. 2, a schematic diagram that illustrates a video decoder featuring debugging functional blocks with debugging capability in accordance with one embodiment of the present invention is shown.

According to FIG. 2, the proposed video decoder system 200 includes: (1) a plurality of functional blocks, wherein each said plurality of functional blocks has an output signal to be used as an input signal for a next stage functional block; (2) a multiplexer (209) that receives a plurality of data extracted from said plurality of output signals from said plurality of functional blocks, and outputs one of said plurality of data according to said data selection code; and (3) a check logic (210) that generates said check data by calculating one of said plurality of data outputted from said multiplexer.

The proposed video decoder system 200 further comprises a header parser 201, a bitstream buffer 202, a variable length decoder (VLD) 203, an inverse discrete Cosine transform (IDCT) 204, a motion compensation (MC) 205, an address translation and arbiter 206, a reconstruction 207, a video decoder controller (VDEC) 208, a multiplexer 209 and a check logic 210, e.g., cycling redundancy check (CRC) logic. The VDEC controller 208 issues control signals to regulate the operation of the above-mentioned functional blocks. The address translation and arbiter 206 connects to a traffic controller 220 and the traffic controller 220 further connects to a storage device 230, e.g., double data rate dynamic random access memory (DDR). The address translation and arbiter 206 further connects to the bitstream buffer 202 and the motion compensation 205. The bitstream buffer 202 connects to the header parser 201 and the variable length decoder (VLD) 203. The header parser 201 connects to the variable length decoder (VLD) 203 and the address translation and arbiter 206. The variable length decoder (VLD) 203 connects to the inverse discrete Cosine transform (IDCT) 204 and the motion compensation 205. The inverse discrete Cosine transform (IDCT) 204 and the motion compensation 205 connect to the reconstruction 207. The reconstruction 207 connects to the address translation and arbiter 206.

There are four data paths which will exchange data with external DRAM. They are header raw data (HD), bitstream buffer (BU), motion compensation (MC) and reconstruction (RC). These four data paths are also coupled to the multiplexer 209. The VDEC controller 208 issues a RC Combine Mode signal to the reconstruction 207 and a data selection signal to the multiplexer 209. The output of the multiplexer 209 is coupled to the check logic 210.

An encoded bitstream data is fetched from the DDR 230 via the traffic controller 220 by the address translation and arbiter 206 and put into the bitstream buffer 202. The encoded bitstream data is then sent to the header parser 201 for parsing system information and such system information is sent back to DDR 230 via the address translation and arbiter 206 for the use of CPU or VDEC controller 208. The bitstream buffer 202 sends the bitstream data to VLD 203 for parsing data information with reference to the information provided by header parser 201. VLD 203 sends the motion vector to IDCT 204 and MC 205. The IDCT 204 will generate a spatial domain difference. MC 205 will fetch a reference frame from the DDR 230 with reference to the motion vector provided by VLD 203. Both the output of IDCT 204 and MC 205 will be sent to and processed through reconstruction 207 to obtain a decoded frame.

To ensure the correctness of the decoded frame, the VDEC controller 208 can select which path is calculated by the check logic 210 by issuing a data selection signal to the multiplexer 209 with a corresponding code, e.g., 00 (RC), 01 (MC), 10 (BU) and 11 (HD). For the reconstruction path (RC), the RC combine mode signal is used to split the IDCT 204 and MC 205 data with a corresponding code, e.g., 00 (IDCT+MC), 01 (IDCT only), 10 (MC only), 11 (picture coding type). At picture coding type, if the data is I/D encoding, the data will go through IDCT 204. If the data is P/B encoding, the data will go through MC 205. The calculation result of the check logic 210 of the selected path is stored within the controller 208. The CPU will compare the calculation result with a corresponding reference data and generate a comparison result. If the comparison result is matched, the decoded frame is correct. If the comparison result is not matched, the decoded frame is incorrect. The multiplexer 209 can select data outputted from each of the functional blocks in a sequential manner for computation by the check logic 210, such that the debugger can look at each specific data path and accurately locate the problem. The check logic is a cyclic redundancy check (CRC) logic comprising a hash function such as a polynomial $1+x^2+x^{15}x^{16}$.

The advantages of the embodiment of the present invention which have been described in the above paragraphs are as follows: (1) prompt identification of errors without the need to dump all external data from external DRAM; (2) insertion of a check logic such as cycling redundancy check (CRC) logic provides a fast debugging tool for MPEG-2 video decoder; (3) recognition of the data path problem made easier by adding some mode selection codes in the decoder which can help the debugger to locate errors without using a logic analyzer.

Although the embodiment of the invention is illustrated by a video decoder, it is not intended to limit thereto. Other types of decoder system can be implemented.

While the invention has been described with reference to one illustrative embodiment, the description is not intended to be construed in a limiting sense. The appended claims will cover any modifications or embodiments as may fall within the scope of the present invention.

What is claimed is:

1. A video decoder capable of generating a-check data in response to a data selection code for debugging, the video decoder comprising:
a plurality of functional blocks configured to process data of an encoded bitstream in a sequential manner to restore a decoded frame, wherein the functional blocks comprise a bitstream buffer, a header parser, a motion compensation block and a reconstruction block, and each of the header parser, the bitstream buffer, the motion compensation block and the reconstruction block respectively issues a distinct output signal;
a multiplexer transmitting data that are selected from one of the output signals from the header parser, the bitstream buffer, the motion compensation block and the reconstruction block, the data that are transmitted by the multiplexer being selected according to a data selection code inputted to the multiplexer;
a check logic generating check data that result from a check computation applied on the data transmitted by the multiplexer; and
a unit configured to detect whether the decoded frame is correct based on the check data.

2. The decoder of claim 1, wherein the functional blocks further comprises a variable length decoder (VLD) having an input connected with the header parser, an inverse discrete cosine transformation (IDCT) having an input connected with an output of the variable length decoder and an output connected with an input of the reconstruction block, and an address translation and arbiter.

3. The decoder of claim 2, wherein the reconstruction block receives a mode selection code indicating which of the output signals from the inverse discrete cosine transformation block and the motion compensation block is selected for processing.

4. The decoder of claim 1, wherein the check logic is a cyclic redundancy check (CRC) logic.

5. The decoder of claim 1, wherein the data selection code allows the multiplexer to select data sequentially from the output signals for transmission to the check logic.

6. A method of debugging a video decoder system, comprising:
providing a plurality of functional blocks configured to process data of an encoded bitstream in a sequential manner to restore a decoded frame, wherein the functional blocks comprise a bitstream buffer, a header parser, a motion compensation block and a reconstruction block, and each of the header parser, the bitstream buffer, the motion compensation block and the reconstruction block respectively issues a distinct output signal;
selecting data from one of the output signals;
obtaining check data resulting from a cyclic redundancy check computation applied on the selected data;
determining whether decoded frame is correct based on the check data; and
when the decoded frame is incorrect, identifying a location of a data error among the output signals of the header parser, the bitstream buffer, the motion compensation block and the reconstruction block.

7. The debugging method of claim 6, wherein data are sequentially selected from each of the output signals and applied with the cycling redundancy check computation.

8. The debugging method of claim 6, wherein the cyclic redundancy check computation includes applying a hash function of the polynomial form $1+x^2+x^{15}+x^{16}$.

* * * * *

UNITED STATES PATENT AND TRADEMARK OFFICE
CERTIFICATE OF CORRECTION

| | | |
|---|---|---|
| PATENT NO. | : 8,156,410 B2 | Page 1 of 1 |
| APPLICATION NO. | : 12/042995 | |
| DATED | : April 10, 2012 | |
| INVENTOR(S) | : Lin et al. | |

It is certified that error appears in the above-identified patent and that said Letters Patent is hereby corrected as shown below:

Column 5, line 5; delete "a-check" and insert in lieu thereof -- check --

Signed and Sealed this
Twenty-sixth Day of June, 2012

David J. Kappos
*Director of the United States Patent and Trademark Office*